US011017109B1

(12) United States Patent
Yancey et al.

(10) Patent No.: US 11,017,109 B1
(45) Date of Patent: May 25, 2021

(54) DYNAMIC SANDBOXING OF USER DATA

(71) Applicant: Apple Inc., Cupertino, CA (US)

(72) Inventors: Kelly B. Yancey, Pleasanton, CA (US); Richard J. Cooper, Santa Clara, CA (US); Richard L. Hagy, Montara, CA (US); Pierre-Olivier Martel, Mountain View, CA (US); David P. Remahl, Woodside, CA (US); Jonathan A. Zdziarski, Bethel, ME (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/404,538

(22) Filed: May 6, 2019

Related U.S. Application Data

(63) Continuation of application No. 16/399,503, filed on Apr. 30, 2019, now abandoned.

(60) Provisional application No. 62/679,801, filed on Jun. 2, 2018.

(51) Int. Cl.
*G06F 21/62* (2013.01)
*G06N 20/00* (2019.01)
*G06F 16/16* (2019.01)

(52) U.S. Cl.
CPC ........ *G06F 21/6218* (2013.01); *G06F 16/168* (2019.01); *G06N 20/00* (2019.01)

(58) Field of Classification Search
CPC .... G06F 21/6218; G06F 16/168; G06N 20/00
USPC ........................................................ 726/27
See application file for complete search history.

(56) References Cited

U.S. PATENT DOCUMENTS

| 6,005,939 | A | * | 12/1999 | Fortenberry | ....... G06Q 20/0855 |
| | | | | | 380/30 |
| 6,928,614 | B1 | * | 8/2005 | Everhart | ................ G06Q 10/10 |
| | | | | | 340/539.19 |
| 8,381,288 | B2 | | 2/2013 | Sahita et al. | |
| 9,449,190 | B2 | | 9/2016 | Centonze et al. | |
| 9,917,837 | B1 | * | 3/2018 | Wick | .................. H04L 61/1511 |
| 2009/0327905 | A1 | * | 12/2009 | Mascarenhas | .......... H04L 67/36 |
| | | | | | 715/738 |
| 2010/0076946 | A1 | * | 3/2010 | Barker | .................. G06F 16/958 |
| | | | | | 707/705 |
| 2012/0330993 | A1 | * | 12/2012 | Faiman | ................ G06Q 10/107 |
| | | | | | 707/769 |

(Continued)

FOREIGN PATENT DOCUMENTS

WO    200016200    3/2000

OTHER PUBLICATIONS

Apple Inc., iOS Security Guide iOS 10—White Paper, Mar. 2017, 68 pages.

(Continued)

*Primary Examiner* — Tae K Kim
*Assistant Examiner* — Peiliang Pan
(74) *Attorney, Agent, or Firm* — Jaffery Watson Mendonsa & Hamilton LLP

(57) ABSTRACT

Embodiments described herein provide techniques to limit programmatic access to privacy related user data and system resources for applications that execute outside of a sandbox or other restricted operating environment while enabling a user to grant additional access to those applications via prompts presented to the user via a graphical interface. In a further embodiment, techniques are applied to limit the frequency in which a user is prompted by learning the types of files or resources to which a user is likely to permit or deny access.

18 Claims, 14 Drawing Sheets

(56) References Cited

U.S. PATENT DOCUMENTS

| | | | |
|---|---|---|---|
| 2015/0186660 A1* | 7/2015 | Sherrets | G06F 21/606 |
| | | | 726/30 |
| 2015/0288817 A1* | 10/2015 | Liu | H04M 3/4365 |
| | | | 379/142.06 |
| 2017/0006430 A1* | 1/2017 | Chao | G06Q 30/0261 |
| 2017/0126817 A1* | 5/2017 | Poliashenko | H04L 63/0876 |
| 2017/0195310 A1* | 7/2017 | Tyler | G06F 21/554 |
| 2018/0063138 A1* | 3/2018 | Rowden | H04L 63/10 |
| 2019/0065736 A1* | 2/2019 | Dharmadhikari | G06F 21/55 |

OTHER PUBLICATIONS

F-Secure XFENCE User Guide, Technical Support Website, https://www.f-secure.com, created/modified May 21, 2017, 26 pages.

\* cited by examiner

DYNAMIC SANDBOXING OF USER DATA

CROSS-REFERENCE

This application is a continuation of U.S. patent application Ser. No. 16/399,503 filed Apr. 30, 2019, which claims priority to U.S. Provisional Patent Application No. 62/679,801 filed Jun. 2, 2018, which is incorporated by reference in its entirety to the extent that it is consistent with this disclosure.

TECHNICAL FIELD

This disclosure relates generally to client and server electronic devices. More specifically, this disclosure relates to a system and associated methods for dynamic sandboxing by learning which of multiple user data files on disk should be accessible from a sandboxed application.

BACKGROUND

A mandatory access control system in which any programmatic access to a resource is validated with the user to determine if the user actually intends to access that resource. This system can act as a defense against surreptitious access to a resource, where malicious software attempts to access hardware or data of a user's system without the user's knowledge. One aspect of the mandatory access control system is the use of an application sandboxing system. An application that executes on a protected computing system described herein can execute within a sandbox, where the application sandbox allows an application developer to pre-define how the developer expects the application to interact with the system. The sandboxing system can then grant the application access to the resources that the application needs to operate normally, while limiting the application's access to resources beyond those specified limitations.

SUMMARY

Embodiments described herein provide techniques to limit programmatic access to privacy related user data and system resources for applications that execute outside of a sandbox or other restricted operating environment while enabling a user to grant additional access to those applications via prompts presented to the user via a graphical interface. In a further embodiment, techniques are applied to limit the frequency in which a user is prompted by learning the types of files or resources to which a user is likely to permit or deny access.

One embodiment provides for a computer-implemented method comprising launching a first process on a computing system having a restricted operating environment, executing the first process outside of the restricted operating environment while allowing default access to a first set of resources, receiving a first request from the first process to access a first resource, the first resource not in the first set of resources, in response to the first request, displaying a prompt via a graphical interface of the computer system to determine a permission to access the first resource by the first process, storing a record of permission to enable the first process to access the first resource, and after storing the record of permission, enabling the first process to access a second resource based on the record of permission to access the first resource, where the first resource and the second resource have a common storage characteristic.

One embodiment provides for a non-transitory machine-readable medium storing instructions which, when executed by one or more processors, cause the one or more processors to perform operations comprising launching a first process on a computing system having a restricted operating environment, executing the process outside of the restricted operating environment while allowing default access to a second set of resources, receiving a delegation of privilege from a second process having access to a second resource, the second resource outside of the second set of resources, the second resource having a first storage classification, recording the delegation of privilege to indicate that the first process is permitted to access the second resource, receiving a request from the first process to access a first resource having the first storage classification, and enabling the first process to access the first resource based on the recorded delegation, where the first resource is in a file system subpath of the second resource.

One embodiment provides a data processing system comprising a memory device to store instructions for execution and one or more processors to execute the instructions from memory. The instructions, when executed, cause the one or more processors to record statistics for access prompts presented via a graphical interface, analyze statistics to determine existence of a pattern, the pattern based on an application and a resource type, receive a request, from a process, to access a resource, where the request would otherwise trigger an access prompt via a user interface of the data processing system, and determine if a pattern exists for the process and the resource type associated with the request. In response to determination that the pattern exists for the process and the resource type associated with the request, the one or more processors are to bypass display of the access prompt and enable or deny access for the process based on the pattern.

Other features of the present embodiments will be apparent from the accompanying drawings and from the Detailed Description, which follows.

BRIEF DESCRIPTION OF THE DRAWINGS

Embodiments of the disclosure are illustrated by way of example, and not by way of limitation, in the figures of the accompanying drawings in which like reference numerals refer to similar elements, and in which.

DETAILED DESCRIPTION

Figure 1:
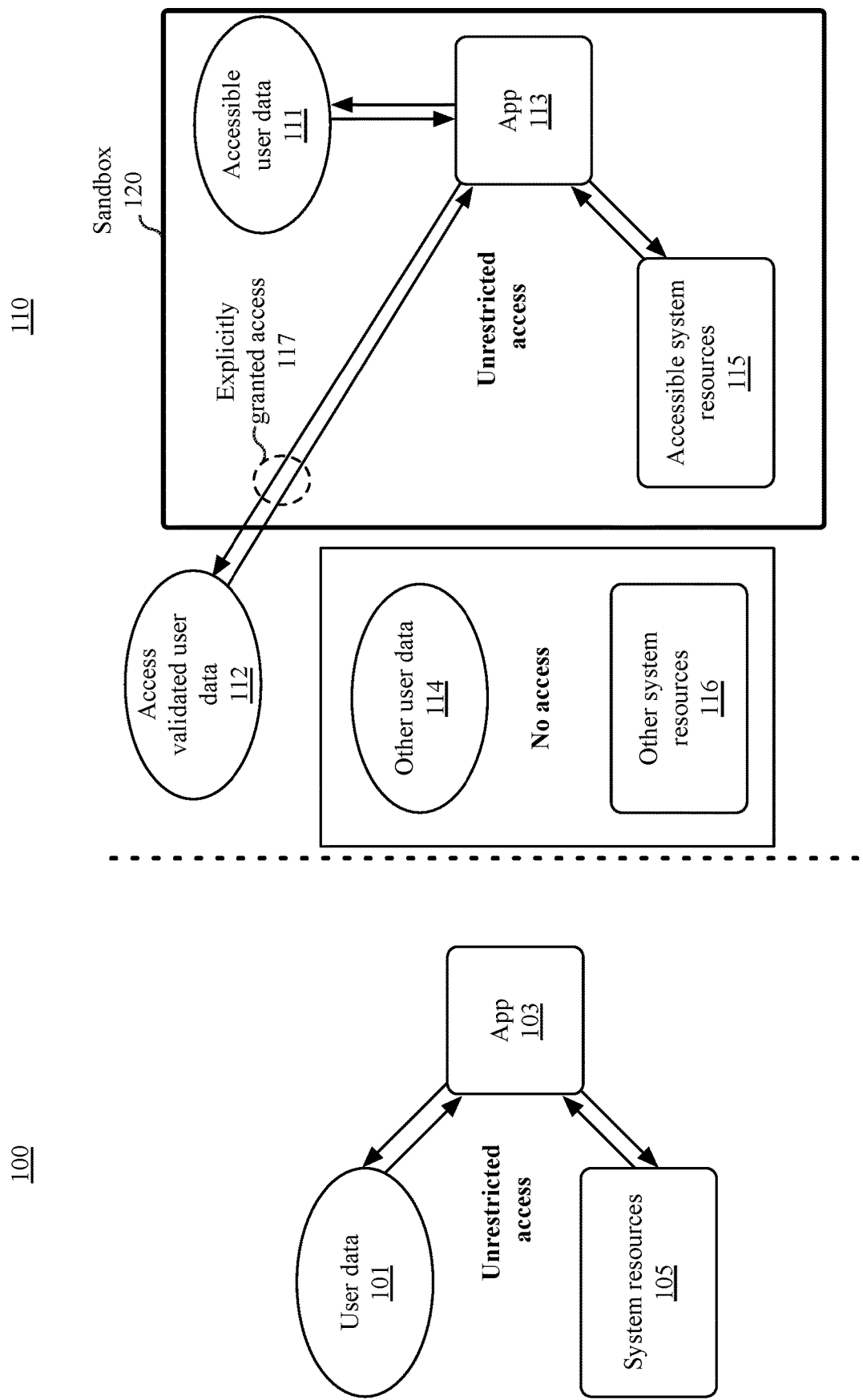
FIG. 1 illustrates a comparison between an un-sandboxed environment and a sandboxed environment on a computing device.

Embodiments described herein provide techniques to limit programmatic access to privacy related user data and system resources for applications that execute outside of a sandbox or other restricted operating environment while enabling a user to grant additional access to those applications via prompts presented to the user via a graphical interface. In a further embodiment, techniques are applied to limit the frequency in which a user is prompted by learning the types of files or resources to which a user is likely to permit or deny access.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software (as instructions on a non-transitory machine-readable storage medium), or a combination of both hardware and software. Reference will be made in detail to various embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of computing devices, user interfaces for such devices, and associated processes for using such devices are described. In some embodiments, the computing device is a portable communications device such as a mobile telephone that also contains other functions, such as PDA and/or music player functions. Exemplary embodiments of portable multifunction devices include, without limitation, the iPhone®, iPad®, and iPod Touch® devices from Apple Computer, Inc. of Cupertino, Calif.

FIG. 1 illustrates a comparison between an un-sandboxed environment 100 and a sandboxed environment 110 on a computing device. A sandboxed application refers to an application that has been restricted within a restricted operating environment (e.g., sandbox) that limits the application to a set of predefined resources. Each sandboxed application may be associated with a set of dedicated system resources, such as, for example, a dedicated memory space, a dedicated storage area, or a virtual machine, etc. One of the purposes of sandboxing an application is to isolate the application from accessing other unnecessary or unrelated system resources of another application or a system component, such that any damage caused by the application would not spill over to other areas of system In an un-sandboxed environment 100, an application (e.g., application 103) has unrestricted access to user data 101 and system resources 105. In a sandboxed environment 110, a sandbox 120 encloses the application (e.g., application 113) such that the application has unrestricted access to resources within the sandbox 120. For example, application 113 can make use of certain accessible system resources 115 and accessible user data 111 that is defined as being part of the sandbox 120 of the application. However, application 113 has no access to other user data 114 or other system resources 116. In one embodiment, an application 113 in a sandbox can be explicitly granted access 117 to access validated user data 112 under certain circumstances. For example, where the sandbox 120 is configured to prevent malicious programmatic access to resources, if a user were to access user data via a trusted graphical interface, the accessed user data can be considered access validated user data 112 that the system determines the user intended to access. Thus, the application 113 in the sandbox 120 can be explicitly granted access 117 to access validated user data 112.

Figure 2:
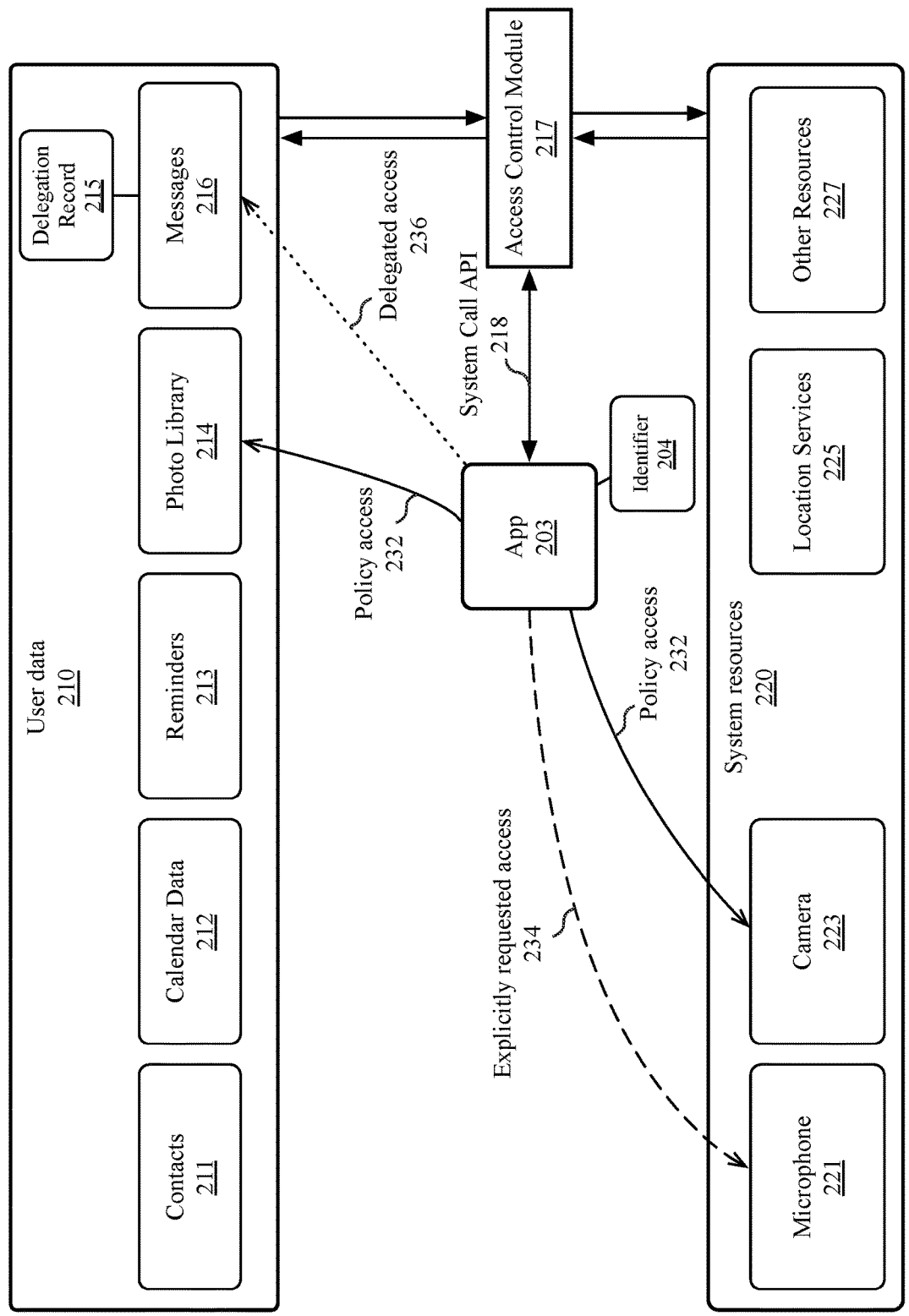
FIG. 2 illustrates a system in which access restrictions are imposed on un-sandboxed applications, according to an embodiment.

FIG. 2 illustrates a system 200 in which access restrictions are imposed on un-sandboxed applications, according to an embodiment. The system 200 includes user data 210 and system resources 220 that can be accessed by an application 203. In one embodiment, access to privacy sensitive user data 210 and system resources 220 is mediated by an access control module 217 for an application 203 that is not executed in a sandbox environment such as the sandboxed environment 110 of FIG. 1. User data 210 that is privacy sensitive can be grouped into different classifications including, but not limited to contacts 211, calendar data 212, reminders 213, a photo library 214, and messages 216, where the messages can include text (e.g., SMS) messages, email messages, and/or instant messages via an instant messaging application. System resources 220 that are privacy sensitive include but are not limited to a microphone 221, a camera 223, location services 225, and other resources 227, which can include software resources, hardware resources, or a combination thereof. Access to the user data 210 can be mediated on a per-classification level. Access to system resources 220 can be mediated on a per-resource level. Various additional types of privacy sensitive information can be protected by the system 200 as either a classification of user data 210 or other types of privacy sensitive resources 220, including but not limited to message history, web browser data (e.g., browser history, cookie data, etc.), system backup data, and any type of location history data that may be stored by the system 200.

In one embodiment, the access control module 217 is a system daemon through which an application 203 can communicate with via a system call API 218, such as an inter-process communication (IPC) call. The application includes an identifier 204 that is used to identify the application to the access control module 217. In one embodiment, the identifier 204 is a universally unique identifier. In one embodiment, the identifier 204 is unique per-system. In one embodiment the identifier 204 is unique per-user.

An application 203 can be provided access to a limited set of resources by default. This default access can be a policy-based access (e.g., policy access 232) that is granted to the application 203 based on the standard functionality of the application. For example, if application 203 is a camera application, the application 203 can be given policy access 232 to a camera 223 and photo library 214 based on a policy associated with the application 203. The system 200 can be configured to disallow access to privacy sensitive system resources by default, except for those to which the application 203 is granted policy access 232. In one embodiment, before the application 203 is granted access to user data 210 our system resources 220 outside of policy, the access control module 217 can trigger a graphical interface prompt by which a user of the system can explicitly grant or deny access to the classification of user data 210 or system resources 220. For example, before application 203 can access the microphone 221 to record audio, the application 203 performs a call through the system call API 218 to the access control module 217 to explicitly request access 234 to the microphone. The user can then grant or deny access to the microphone.

In embodiments described herein, the system 200 includes a variety of mechanisms to reduce the number of prompts that are displayed to a user. In one embodiment, a user decision in response to explicitly requested access 234 is stored to a set of per-user access control records and that decision is persisted for the application 203, as described further in FIG. 4. In one embodiment, trusted system services can delegate access to the application when those services are used to access user data 210 or system resources 220. For example, if a user were to attempt to send a photo as a message, for example, via a drag-and-drop action via the system user interface, the system user interface can use the system call API 218 to provide delegated access 236 to messages 216 without requiring the access control module 217 to prompt the user. This delegated access 236 can then be persisted as a delegation record 215 that is associated with the messages 216. If the application 203 uses a trusted system UI interface when enabling a user to access a file within a privacy sensitive location within the file system, the trusted system UI interface can delegate access to the file. For user data 210, access can be requested, granted, or delegated on the basis of classification, rather than individual files.

In one embodiment, delegation of access to a file having a certain classification is extended based on file system structure. For example, delegated access to a target file or folder having the classification of photo library 214 is also granted to the subpath of the target file, provided that the subpath is of the same classification. For example, if application 203 is delegated access to "~j/Photos/Vacation" via the system UI, then the delegation applies to "~/Photos/Vacation/2018," "~/PhotosNacation/2019," and any other subpath of "Photos/Vacation," provided that those subpaths are of the same classification (e.g., Photo Library 214). The delegated access allows the application 203 to access those subpaths without triggering a UI prompt to request access. However, delegated access to the photo library 214 classification for the user home directory will not allow access to other classifications (e.g., contacts 211, calendar data 212, etc.). If the application 203 attempts to access such data via the system call API 218, a UI prompt will be triggered. If the application 203 attempts such access without use of the system call API 218, for example, if the application 203 is a malicious application, the system 200 will block access by the application 203.

In one embodiment access is granted on a per-application and per-resource (e.g., user data 210, system resources 220, etc.) basis. If access is granted to a resource for a first application, that access is only effective for the first application. A second application, may be required to explicitly request access or to be delegated access to the same resource. In one embodiment, the system 200 can perform operations to learn the combinations of applications, user data 210, and system resources 220 for which the user will grant or deny access. For example, if a user executes multiple different photo editing applications and explicitly requested access 234 or delegated access 236 is granted for a first photo editing application, the system 200 can determine that access should be granted for a second photo application. If the user denies access to the microphone 221 for a first camera application, the system 200 can determine that the user will deny access to the microphone 221 for a second camera application and bypass the prompting of the user. The learning threshold can be tuned for different types of applications and resources and can vary based on a level of privacy associated with an underlying resource. For example, all applications without policy access 232 to the camera 223 may require a prompt before access is allowed by the access control module 217.

Figure 3:
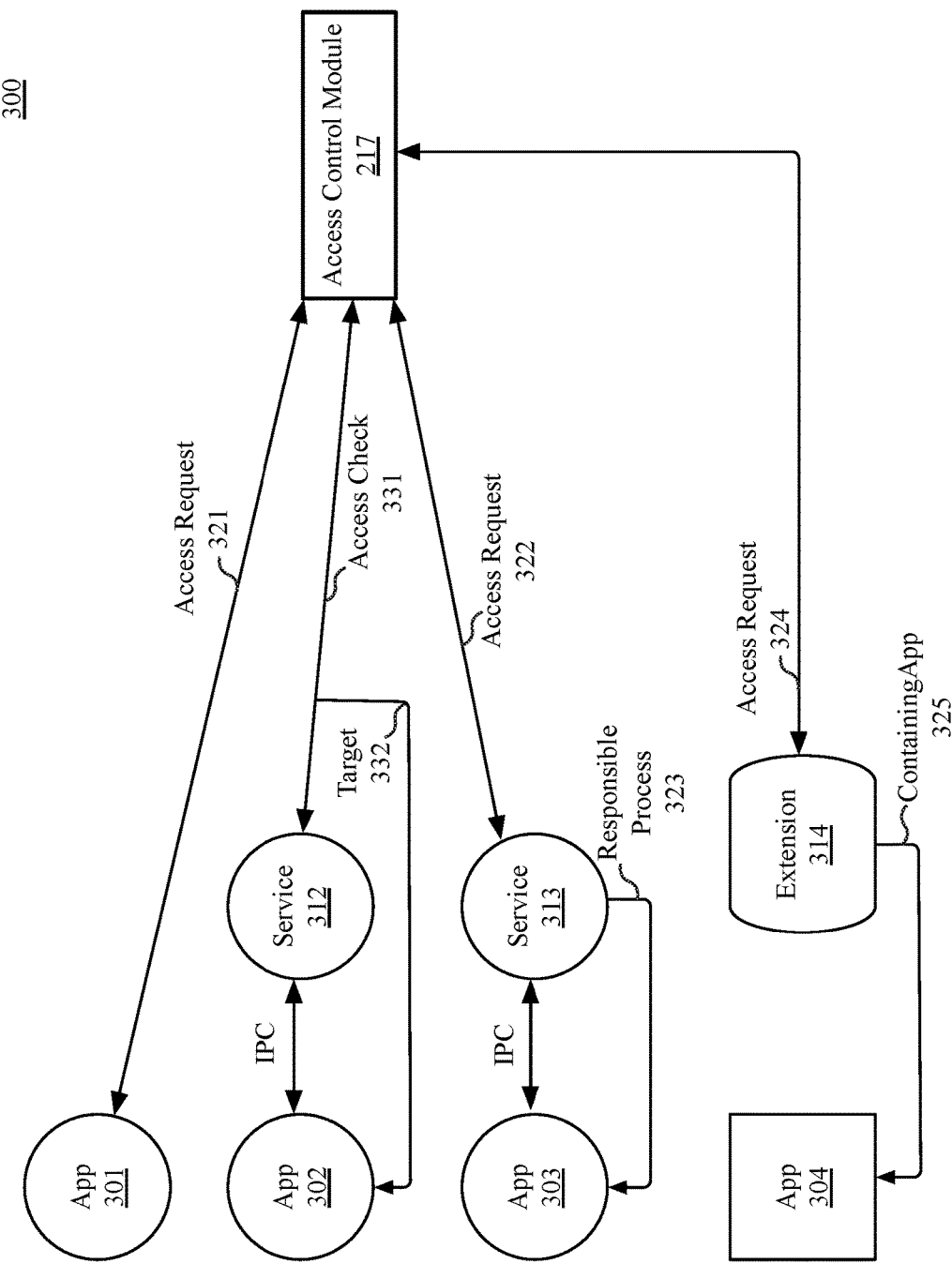
FIG. 3 illustrates a system for performing access via the system call API, according to an embodiment.

FIG. 3 illustrates a system 300 for performing access via the system call API, according to an embodiment. An application 301 can make an access request call (321) to the access control module 217 to request access for itself. A system service 312 having an application 302 as an IPC client can perform an access check call (331) for the application 302. For the access check call (331) application 302 is the target 332 that is evaluated by the access control module 217. Where the service 312 has access to the resource in question, the access check call (331) can be performed as part of the delegation process. In one embodiment, a service 313 can perform an access request call (322) on behalf of an application 303 that is the responsible process 323 for the service 313, meaning that the application 303 is responsible for the initial creation of the process for the service 313. In one embodiment, where an extension 314 performs an access request call (324), the target of the access request call is the containing application 325 for the extension (e.g., application 304).

Figure 4:
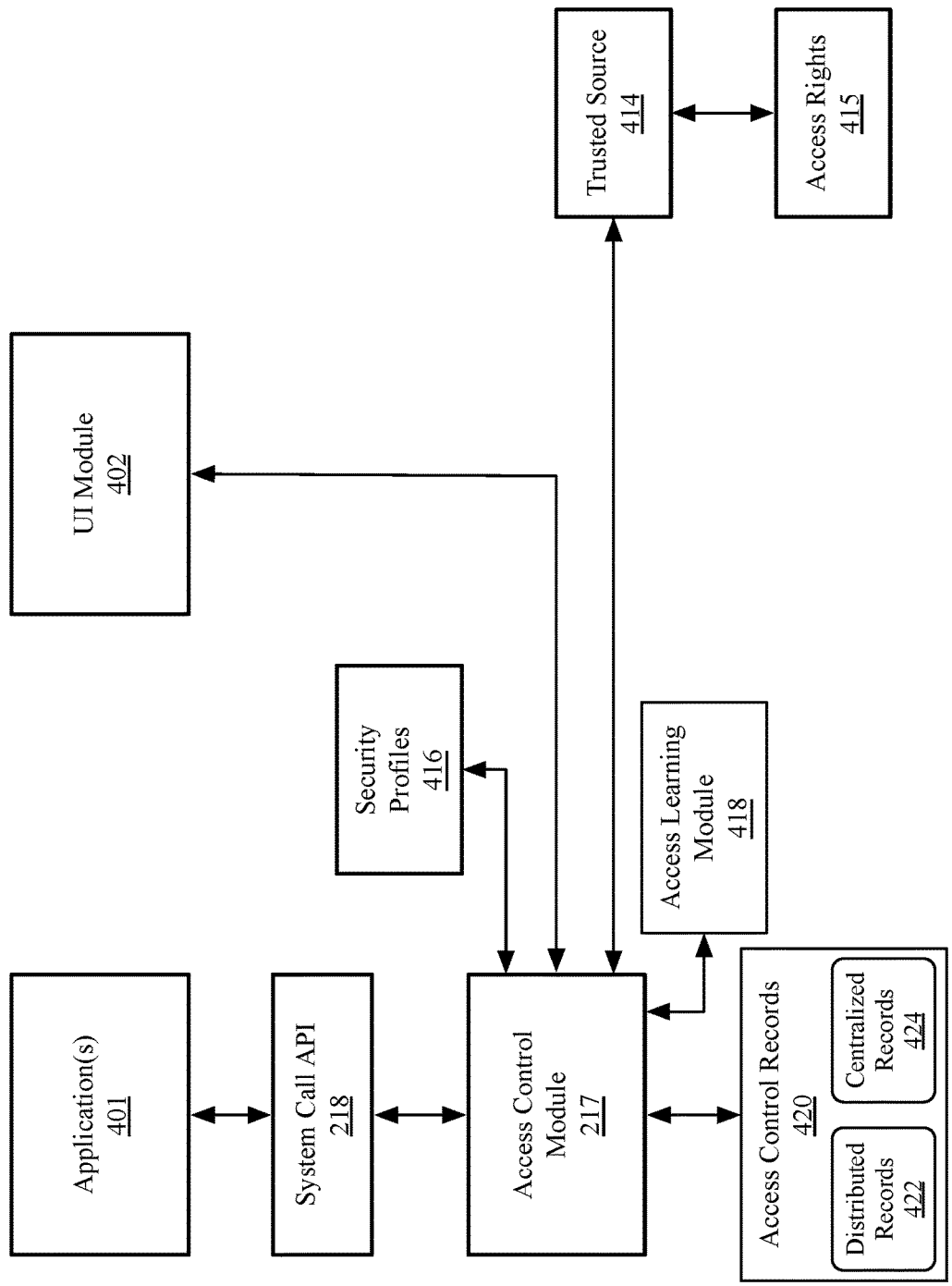
FIG. 4 is a block diagram illustrating a system for operating a program in a restricted operating environment, according to an embodiment.

FIG. 4 is a block diagram illustrating a system 400 for operating a program in a restricted operating environment, according to an embodiment. The system 400 can represent any computing device, such as, but not limited to, desktops, laptops, tablets, mobile phones (e.g., smartphones), digital personal assistants (PDAs), media players, gaming devices, televisions or television set-top boxes, smart appliances, and smart speaker devices. In one embodiment, the system 400 includes one or more applications 401 that are communicatively coupled via a system call API 218 to the access control module 217. The applications 401 communicate via the system call API 218 to the access control module 217 to gain access to resources such as privacy sensitive user data or system resources that can be used to monitor a user. Default access for certain resources can be provided to the applications 401 via security profiles 416. A security profile for an application can be dynamically generated by compiling a set of one or more rules that specify resources to which an application can access.

To access additional resources, access rights 415 can be delegated to the application by a trusted source 414. The trusted source 414 can be a trusted system component such as a UI element through which the applications 401 can enable a user to access a file or other resource. In one embodiment, the system 400 limits the type of programmatic manipulation that is possible for a trusted source 414. Accessing the resource through the trusted source 414 provides verification of the user intent to access the resource while preventing malicious programmatic access to the resource. Alternatively, the access control module 217 can trigger a UI module 402 to display a dialog that requests a user to explicitly grant or deny access to a resource in response to an attempt by one of the applications 401 to access the resource. A record of access status (grant, deny, read-only, etc.) can be recorded for the resource based on the response provided to the UI module 402.

In some embodiments, the system 400 can maintain persistent access control records 420 to record the past behavior of a user and use that past behavior to recall the user's decisions when later presented with an access determination for the same application and the same data files or system resources. The access control records 420 can record access decisions on a per-user basis, with each user on the system having a separate record instance. In one embodiment the access control records 420 identify a resource, such as a file, folder, or system resource, for which the user has permitted or denied access, as well as the specific application or process that triggered the access request. In one embodiment, the access control records 420 can store an unknown status for some resources, which can indicate that no prompt results or rights delegation has been recorded for the resource.

In one embodiment the access control records 420 include distributed records 422 and centralized records 424. Distributed records 422 are used to persist access that was previously granted or denied to data files or folders. Distributed records 422 include, but are not limited to delegation records 215 as in FIG. 2. In one embodiment, distributed records 422 can be stored in extended file system data for files or folders containing user data. For distributed records 422, if a file or folder for which a record exists is deleted, in one embodiment the portion of the distributed records 422 associated with that file or folder can also be deleted. Centralized records 424 can be stored in a central database for each user and can be used specifically to record the results of an access request for a system resource, such as a microphone, camera, location services, and other privacy sensitive system resources.

In one embodiment the access control module 217 couples with an access learning module 418. The access learning module 418 can be configured to reduce the number of prompts provided to a user via the UI module 402 by learning the types of accesses that are granted are denied and the types of applications for which access is granted or denied. For example, in one embodiment if a user has drag-and-dropped a document into an application or selected a document for the application to open via a standard operating system dialog, the operating system can learn that the user expects that application to access that document and will allow the application to open the document in the future, even if the application opens the document via different techniques than the operating system dialog.

In one embodiment, the access learning module 418 can also learn based on application usage and access patterns. When a user regularly grants or denies access to files of a certain classification to a certain type of application, the access learning module can reduce the number of prompts displayed to the user via the UI module 402 by maintaining statistics about previous access prompts and the applications and resources associated with those access prompts. For example, if a user executes multiple different photo editing applications and access is granted for a first photo editing application, the access learning module can determine that access should be granted for a second photo application. If the user denies access to the microphone for a first camera application, the access learning module 418 can determine that the user denies access to the microphone 221 for the second camera application without prompting the user.

In one embodiment, the statistics can be used to train a machine learning module within the access learning module 418. The access control module 417 can query the access learning module before requesting a prompt via the UI module 402 to determine if the prompt can be bypassed. In one embodiment, the user is provided an opportunity to review and override determinations made by the access learning module. The statistics gathered with respect to application usage and access prompt selections, including any training data used to train the machine learning module, may be considered private user data and by default is maintained only on the local machine of the user. Such information will not be synced across devices using, for example, cloud storage synchronization unless the user explicitly requests such synchronization. Additionally, the user may be prompted to opt-in to the collection of application usage and application prompt statistics before such information is gathered by the system. For example, a graphical interface prompt may be presented to the user to allow the user to opt-in to the collection of application usage statistics. Until and unless the user authorizes the collection of such statistics, learning-based access determination may not be performed on the system.

In one embodiment, some user data or system resources are considered to be of a level of privacy sensitivity that some types access requests will be automatically denied without prompting the user via the UI module 402. For example, if a non-email application attempts to access an e-mail database of a user, the system 400 can block access without prompting the user.

FIG. 5-FIG. 9 illustrate processes and logic operations to implement concepts described herein. Some operations are described below in terms of sequential operations. However, it should be appreciated that some of the operations described may be performed in a different order. Moreover, some operations may be performed at least partially in parallel rather than sequentially. The operations are performed by program logic and associated hardware instructions an access control module 217, UI module 402, access learning module 418, and system libraries described herein.

Figure 5:
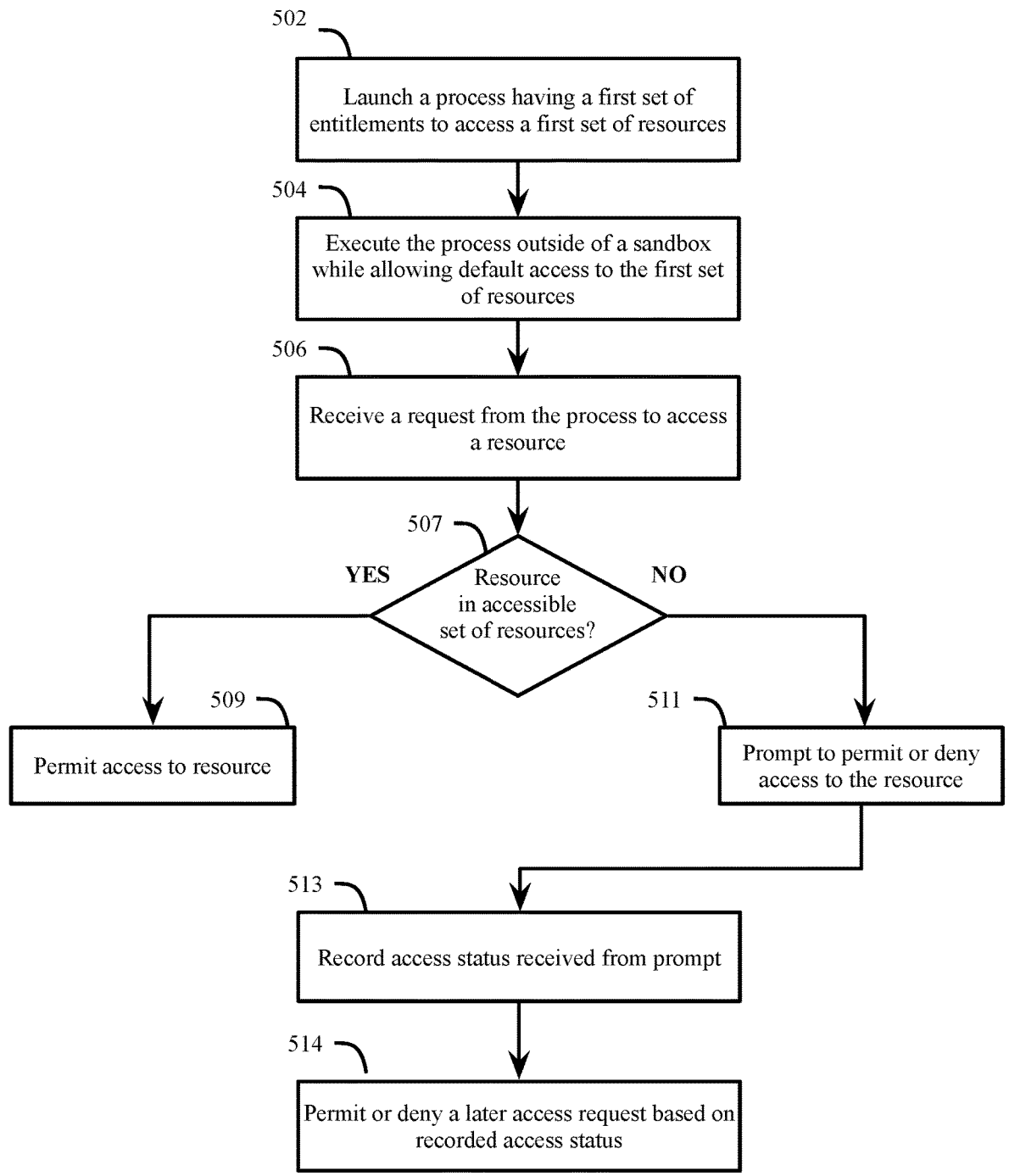
FIG. 5 illustrates a flow diagram of program logic to control access for non-sandboxed applications, according to an embodiment.

FIG. 5 is a flow diagram of program logic 500 to control access for non-sandboxed applications, according to an embodiment. In one embodiment the logic 500 includes instructions to perform operation 502 to launch a process having a first set of entitlements to access a first set of resources. Logic 500 can then perform operation 504 to execute the process outside of a sandbox while allowing default access to the first set of resources. Logic 500 can perform operation 506 to receive a request from the process to access a resource.

If the requested resource is in an accessible set of resources, as determined by operation 507, logic 500 can permit access to the resource via operation 509. If the requested resource is not in the accessible set of resources, logic 500 can perform operation 511 to display a graphical interface prompt to a user to enable the user to permit or deny access to the resource. Logic 500 can then record the access status received from the prompt via operation 513. In one embodiment the user can permit or deny access to the resource, and can also enable limited (e.g., read-only) access to the resource. The access status received from the prompt is applicable to the process or associated application for which the access was prompted. The access status received from the prompt is specific to the process, or an application associated with the process. In one embodiment, logic 500 can perform operation 514 to permit or deny a later access request based on the recorded access status.

Figure 6:
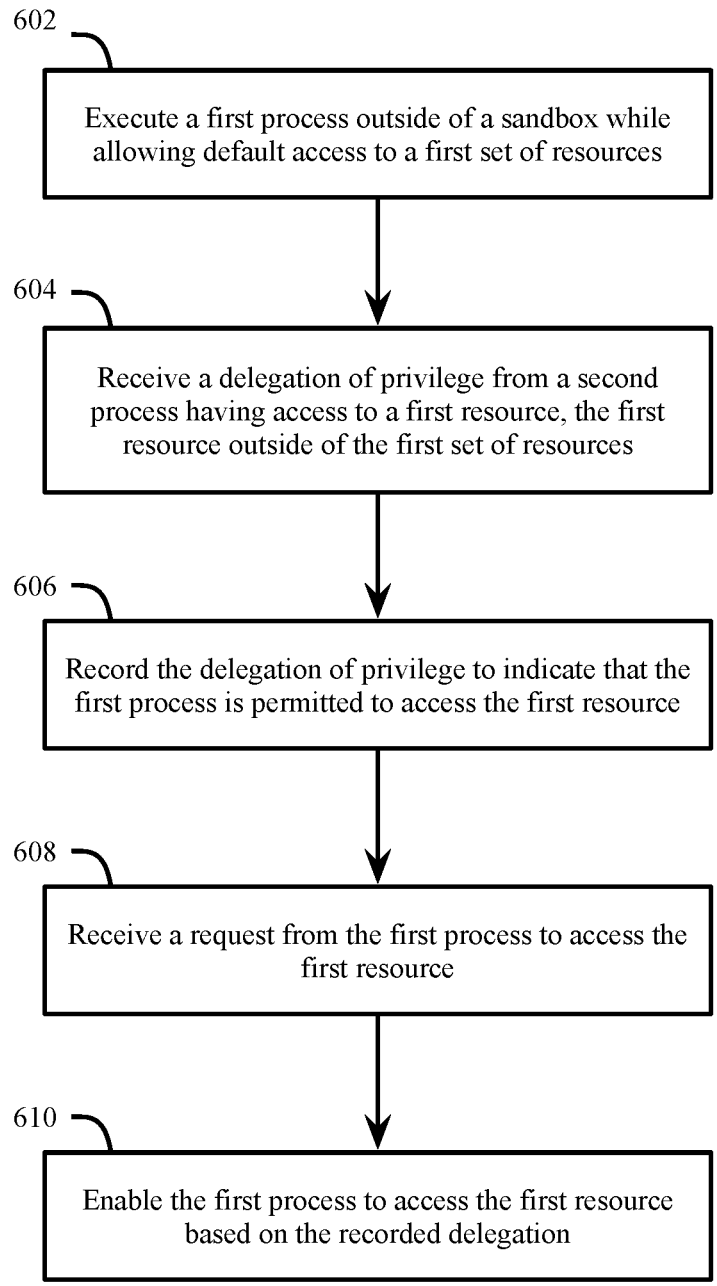
FIG. 6 is a flow diagram illustrating a flow diagram of program logic for delegation of access, according to an embodiment.

FIG. 6 is a flow diagram illustrating a flow diagram of program logic 600 for delegation of access, according to an embodiment. Logic 600 includes instructions to perform operation 602 to execute a first process outside of a sandbox while allowing default access to a first set of resources. Logic 600 can additionally perform operation 604 to receive a delegation of privilege from a second process having access to a first resource, the first resource outside of the first set of resources. Logic 600 further includes instructions to perform operation 606, which records the delegation of privilege to indicate that the first process is permitted to access the first resource.

After the recording of the delegation performed by operation 606, logic 600 can receive a request from the first process to access the first resource via operation 608. In response, operation 610 can enable the first process to access the first resource based on the recorded delegation.

Figure 7:
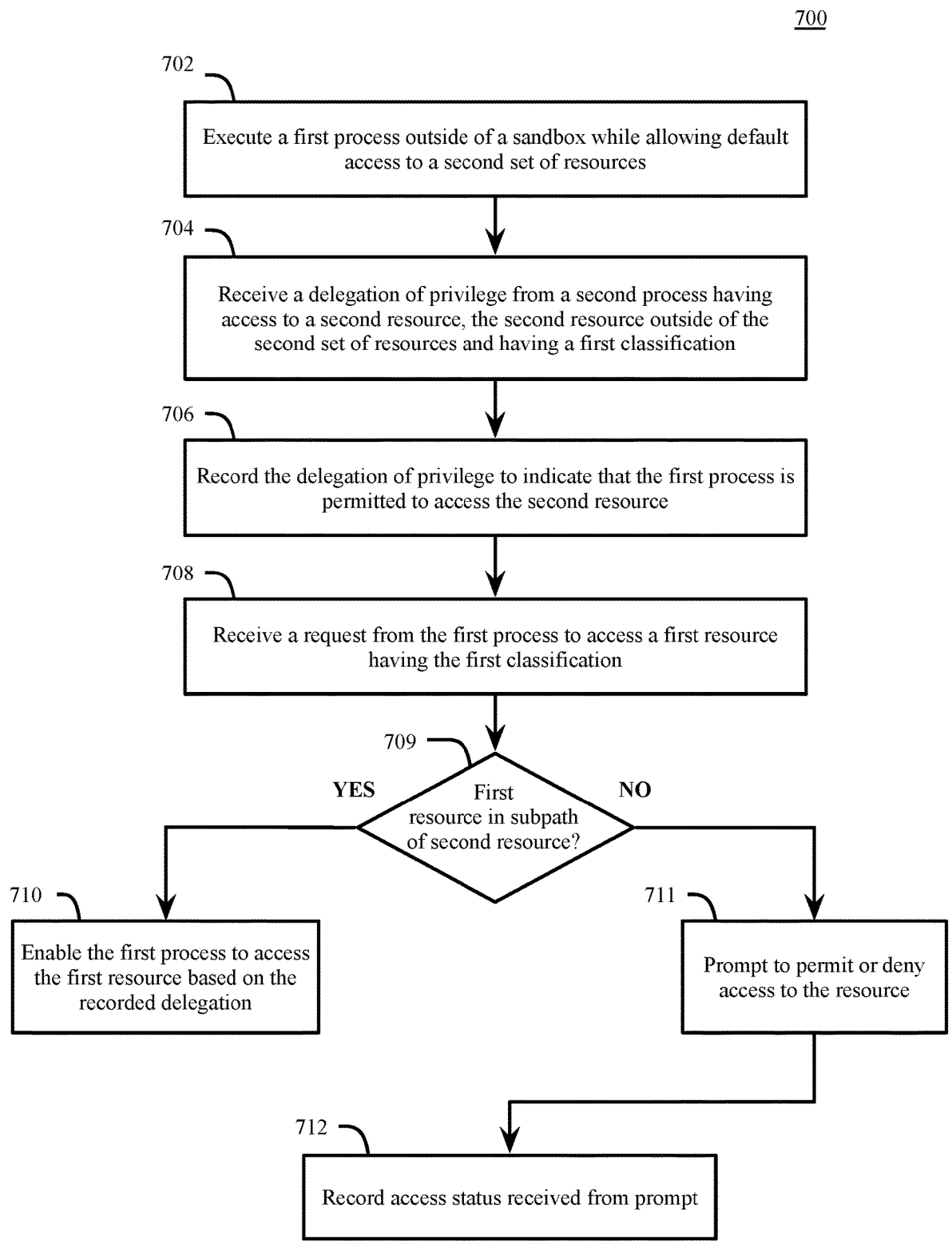
FIG. 7 is a flow diagram of additional program logic to control access for non-sandboxed applications, according to an embodiment.

FIG. 7 is a flow diagram of additional program logic 700 to control access for non-sandboxed applications, according to an embodiment. Logic 700 can improve a user experience with the access control system described herein by reducing a number of graphical interface prompts that are presented to a user by extending access rights enabled by delegation of privilege to resources within a file system subpath of an accessible resource. Logic 700 includes instructions to perform operation 702 to execute a first process outside of a sandbox while allowing default access to a second set of resources. Logic 700 also includes instructions to perform operation 704 to receive a delegation of privilege from a second process having access to a second resource, the second resource outside of the second set of resources and having a first classification. Logic 700 includes additional instructions to perform operation 706 to record the delegation of privilege to indicate that the first process is permitted to access the second resource.

After the recording of the delegation performed by operation 706, logic 700 can perform operation 708, which receives a request from the first process to access a first resource having the first classification. Logic 700 can then perform operation 709 to determine if the first resource is in a subpath of the second resource. If the first resource is determined to be in the subpath of the second resource, logic 700 can perform operation 710 to enable the first process to access the first resource based on the recorded delegation. If the first resource is not in the subpath of the second resource, logic 700 can perform operation 711 to prompt to permit or deny access to the resource. Logic 700 can then perform operation 712 to record an access status received from prompt.

Figure 8:
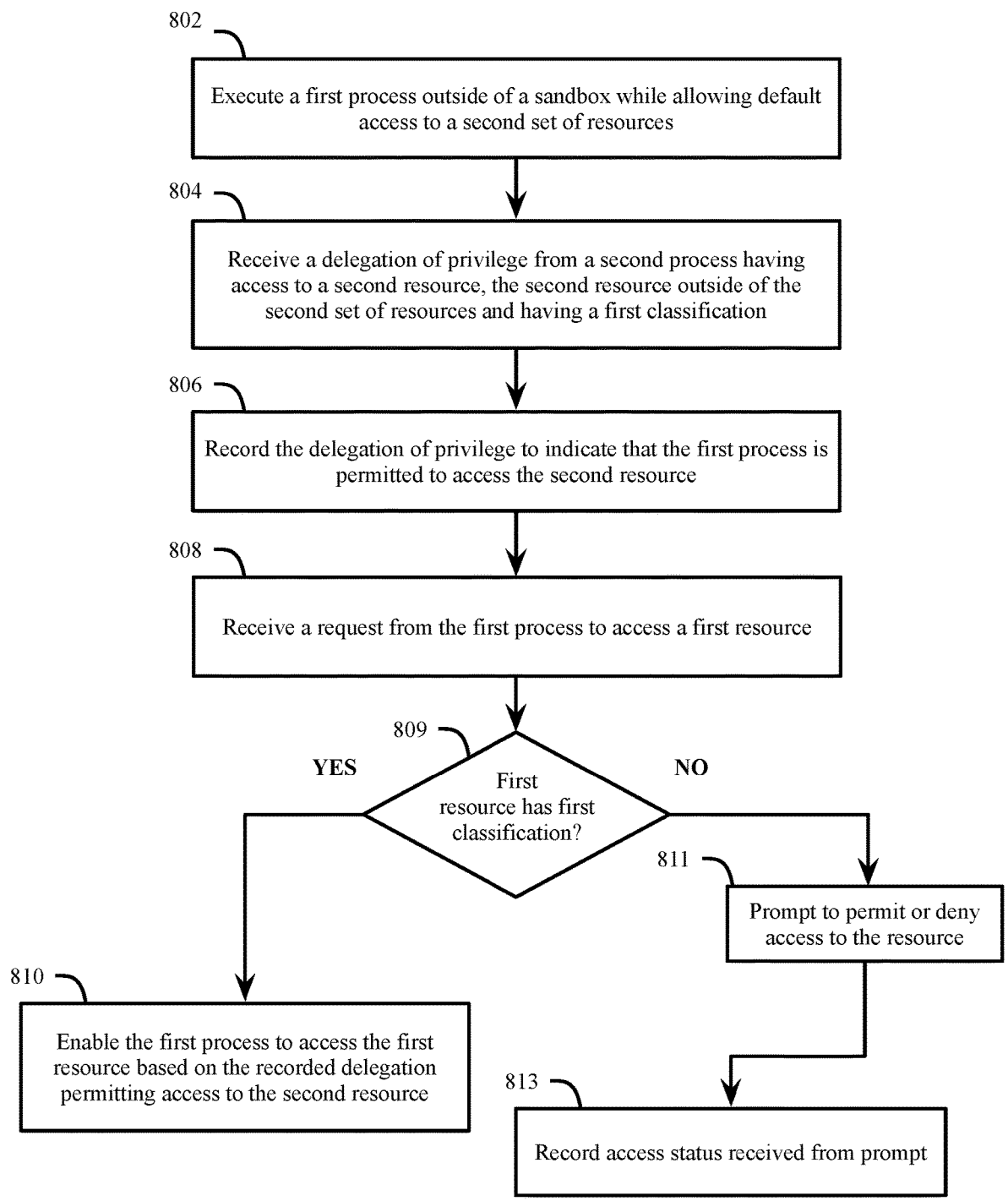
FIG. 8 is flow diagram of additional program logic to control access for non-sandboxed applications, according to an embodiment.

FIG. 8 is flow diagram of additional program logic 800 to control access for non-sandboxed applications, according to an embodiment. Logic 800 can enhance user privacy by limiting delegated access based on a classification of a resource. Logic 800 includes instructions to perform operation 802 to execute a first process outside of a sandbox while allowing default access to a second set of resources. Logic 800 can additionally perform operation 804 to receive a delegation of privilege from a second process having access to a second resource, the second resource outside of the second set of resources and having a first classification. Additionally, logic 800 can record the delegation of privilege to indicate that the first process is permitted to access the second resource.

After the recording of the delegation performed by operation 806, logic 800 can perform operation 808, which receives a request from the first process to access a first resource. Logic 800 can perform operation 809 to determine if the first resource has first classification. If the first resource has the first classification, logic 800 can perform operation 810 to enable the first process to access the first resource based on the recorded delegation permitting access to the second resource. If the first resource does not have the first classification, logic 800 can perform operation 811 to prompt to permit or deny access to the resource. Logic 800 can then perform operation 813 to record an access status received from prompt.

Figure 9:
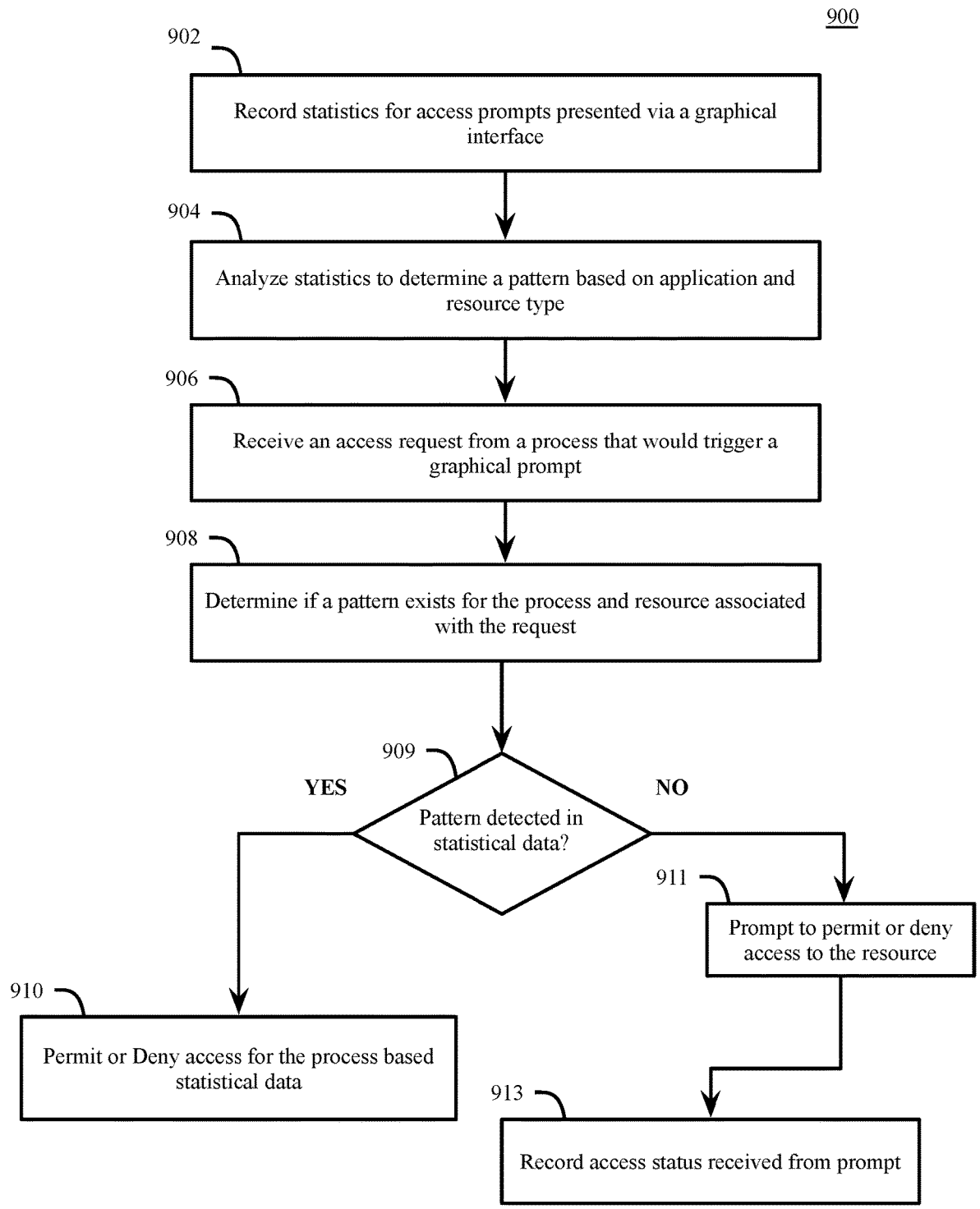
FIG. 9 is flow diagram of program logic to reduce a frequency of access prompts, according to an embodiment.

FIG. 9 is flow diagram of program logic 900 to reduce a frequency of access prompts, according to an embodiment. Logic 900 can reduce a frequency of access prompts by enabling or denying access requests based on past responses. In one embodiment, logic 900 is performed by an access learning module 418 as in FIG. 4.

Logic 900 includes instructions to perform operation 902 to record statistics for access prompts presented via a graphical interface. Logic 900 can further perform operation 904 to analyze statistics to determine a pattern based on application and resource type. Subsequent to operation 904, logic 900 can perform operation 906, which receives an access request from a process that would trigger a graphical prompt. Logic 900 can then perform operation 908 to determine if a pattern exists for the process and resource associated with the request. If logic 900 detects a pattern in the statistical data, as shown at block 909, logic 900 can perform operation 910 to either permit or enable access for the process based in the statistical data, or deny access for the process based on the statistical data. If no pattern is detected, logic 900 can perform operation 911 to prompt to permit/enable or deny access to the resource. Logic 900 can then perform operation 913 to record an access status received from prompt.

The types of patterns that may be detected include the regular and frequent allowance of a process associated with an image editing application to access image files, or the frequent allowance of a process associated with an audio or music editing application to access audio or music files. Once the logic 900 detects such statistical patterns, permission can be granted for certain processes to access certain types of resources based on the approval statistics, bypassing the display of the graphical prompt. In one embodiment the analysis of the statistics can be performed by generating a training data set based on the recorded statistics and training a machine learning module within the access learning module. Logic 900 can query the access learning module before requesting a user interface prompt to determine if the prompt can be bypassed. The user can be provided an opportunity to review and override determinations made by the logic 900.

Embodiments described herein include one or more application programming interfaces (APIs) in an environment in which calling program code interacts with other program code that is called through one or more programming interfaces. Various function calls, messages, or other types of invocations, which further may include various kinds of parameters, can be transferred via the APIs between the calling program and the code being called. In addition, an API may provide the calling program code the ability to use data types or classes defined in the API and implemented in the called program code.

An API allows a developer of an API-calling component (which may be a third-party developer) to leverage specified features provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments, the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other embodiments, the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some embodiments, an API may allow a client program to use the services provided by a Software Development Kit (SDK) library. In other embodiments, an application or other client program may use an API provided by an Application Framework. In these embodiments, the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low-level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however, the API may be implemented in terms of a specific programming language. An API-calling component can, in one embedment, call APIs from different providers such as a set of APIs from an OS provider and another set of APIs from a plug-in provider and another set of APIs from another provider (e.g., the provider of a software library) or creator of the another set of APIs.

Figure 10:
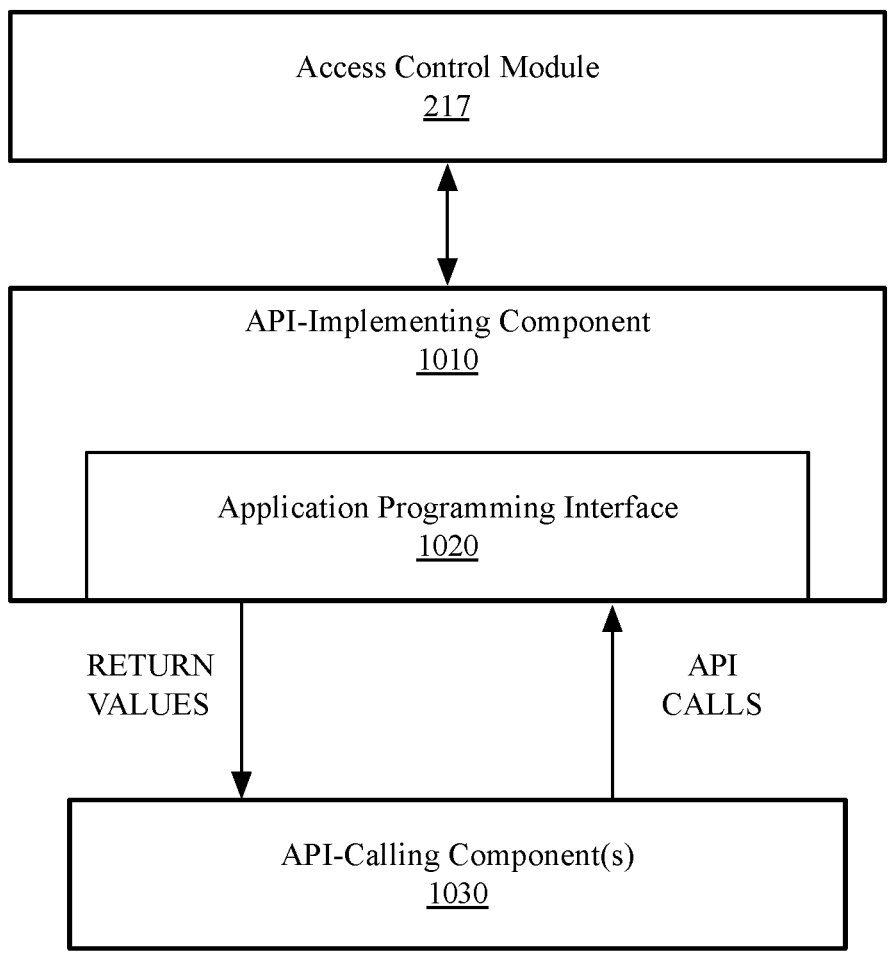
FIG. 10 is a block diagram illustrating an exemplary API architecture, which may be used in some embodiments of the invention.

FIG. 10 is a block diagram illustrating an exemplary API architecture, which may be used in some embodiments of the invention. As shown in FIG. 10, the API architecture 1000 includes the API-implementing component 1010 (e.g., an operating system, a library, a device driver, an API, an application program, software or other module) that implements the API 1020. The API 1020 specifies one or more functions, methods, classes, objects, protocols, data structures, formats and/or other features of the API-implementing component that may be used by the API-calling component 1030. The API 1020 can specify at least one calling convention that specifies how a function in the API-implementing component receives parameters from the API-calling component and how the function returns a result to the API-calling component. The API-calling component 1030 (e.g., an operating system, a library, a device driver, an API, an application program, software or other module), makes API calls through the API 1020 to access and use the features of the API-implementing component 1010 that are specified by the API 1020. The API-implementing component 1010 may return a value through the API 1020 to the API-calling component 1030 in response to an API call.

It will be appreciated that the API-implementing component 1010 may include additional functions, methods, classes, data structures, and/or other features that are not specified through the API 1020 and are not available to the API-calling component 1030. It should be understood that the API-calling component 1030 may be on the same system as the API-implementing component 1010 or may be located remotely and accesses the API-implementing component 1010 using the API 1020 over a network. While FIG. 10 illustrates a single API-calling component 1030 interacting with the API 1020, it should be understood that other API-calling components, which may be written in different languages (or the same language) than the API-calling component 1030, may use the API 1020.

The API-implementing component 1010, the API 1020, and the API-calling component 1030 may be stored in a machine-readable medium, which includes any mechanism for storing information in a form readable by a machine (e.g., a computer or other data processing system). For example, a machine-readable medium includes magnetic disks, optical disks, random-access memory; read only memory, flash memory devices, etc.

In one embodiment, the access control module 217 described herein can be communicatively coupled with the API-implementing component 1010 to mediate access to privacy related system resources such as the user data and system resources illustrated in FIG. 2. Before the API-implementing component 1010 can perform some operations, the API implementing component 1010 can communicate with the access control module 217 to determine if such operations can be performed.

Figure 11A:
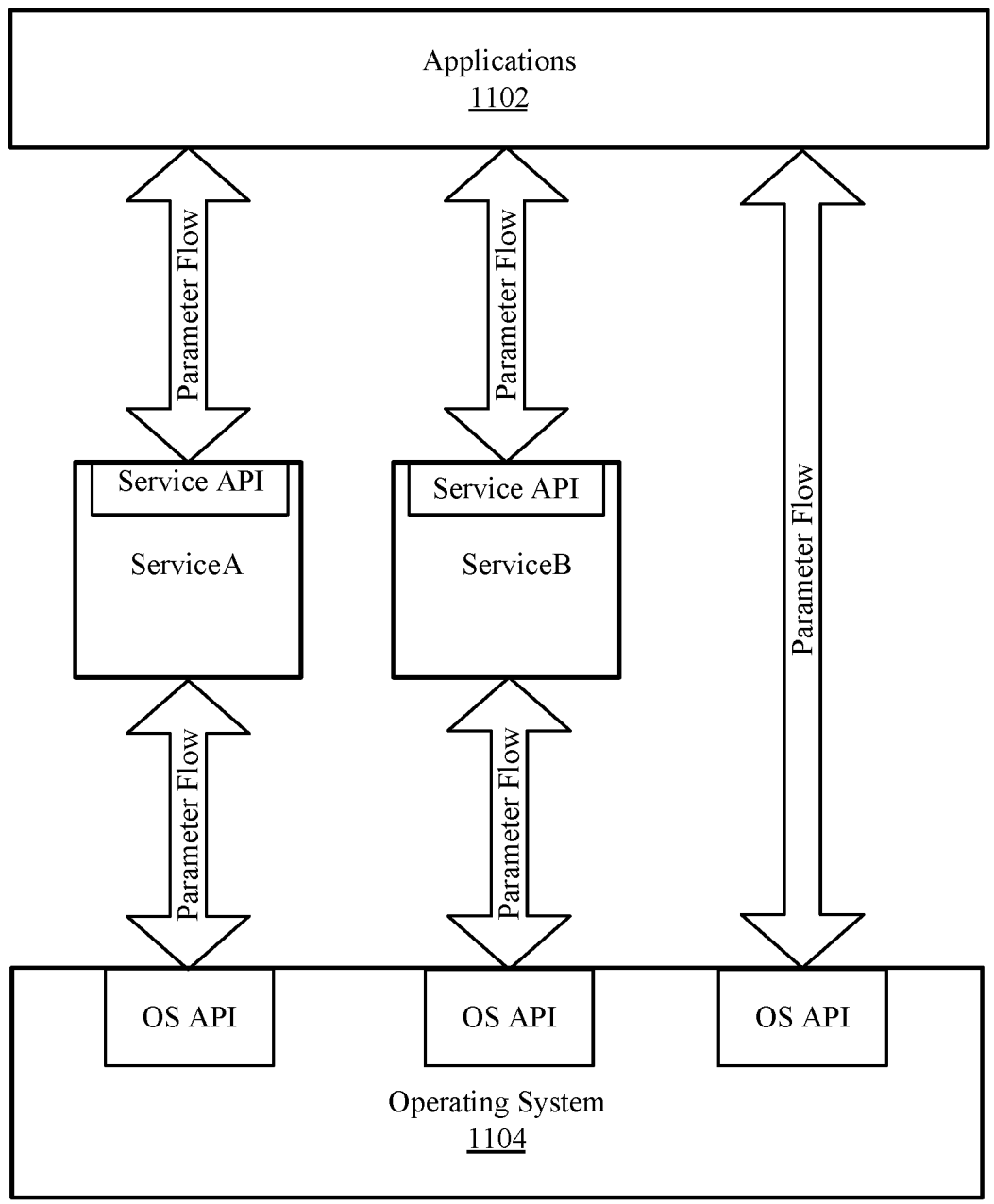
FIG. 11A-11B are block diagrams of exemplary API software stacks, according to embodiments.
Figure 11B:
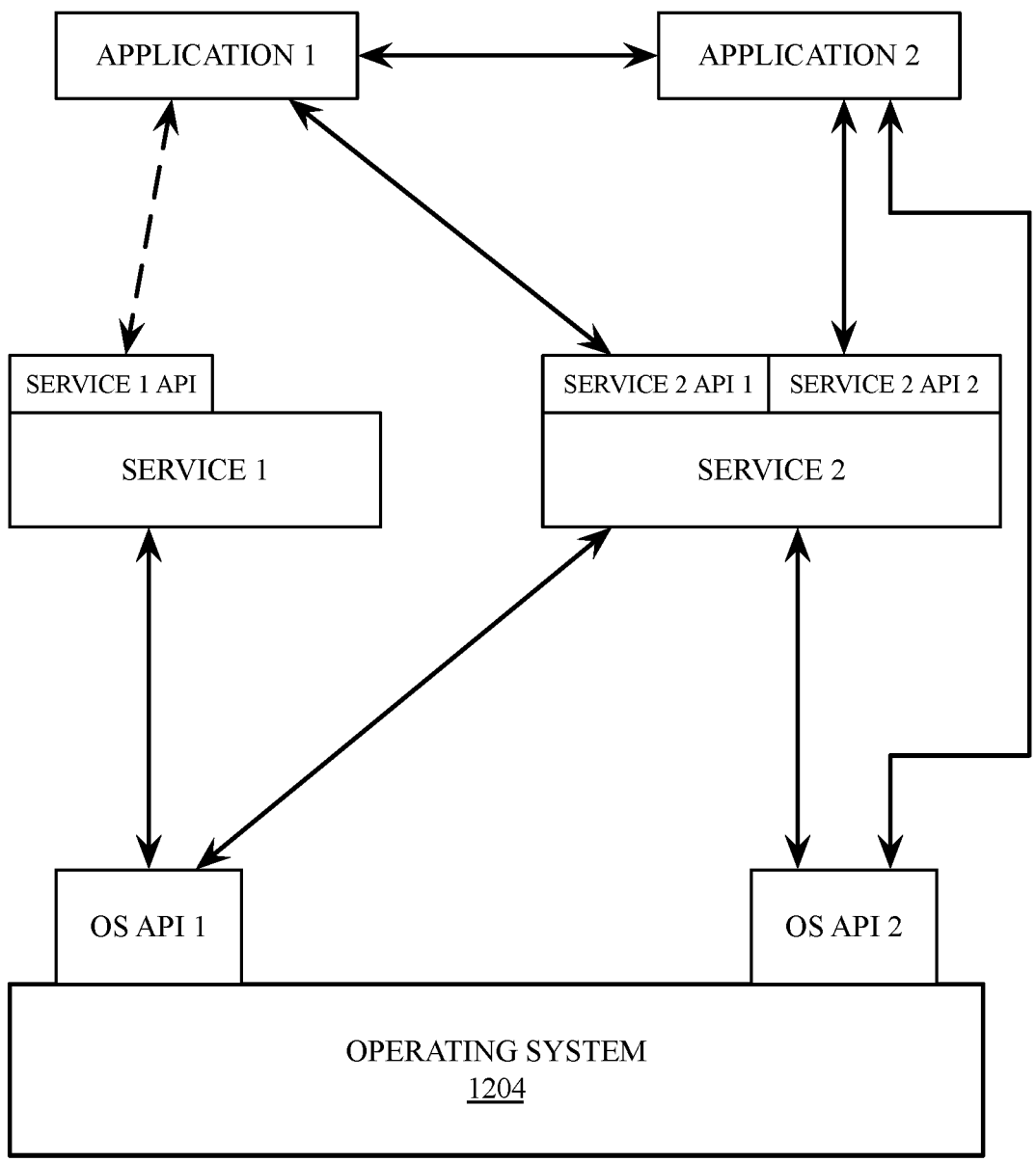

FIG. 11A-11B are block diagrams of exemplary API software stacks 1100, 1110, according to embodiments. FIG. 11A shows an exemplary API software stack 1100 in which applications 1102 can make calls to Service A or Service B using Service API and to Operating System 1104 using an OS API. Additionally, Service A and Service B can make calls to Operating System 1104 using several OS APIs.

FIG. 11B shows an exemplary API software stack 1110 including Application 1, Application 2, Service 1, Service 2, and Operating System 1104. As illustrated, Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

In one embodiment, the access control module 217 described herein can limit the types of interactions that applications can perform relative to each other. For example, in one embodiment Application 1 can exercise control over Application 2. The access control module 217 can determine whether Application 1 has permission to control Application 2. Furthermore, the access control module 217 can be used to limit the types of events that a system can receive programmatically. The access control module 217 can also prevent applications from using network sharing of local folders to bypass file system protections.

Figure 12:
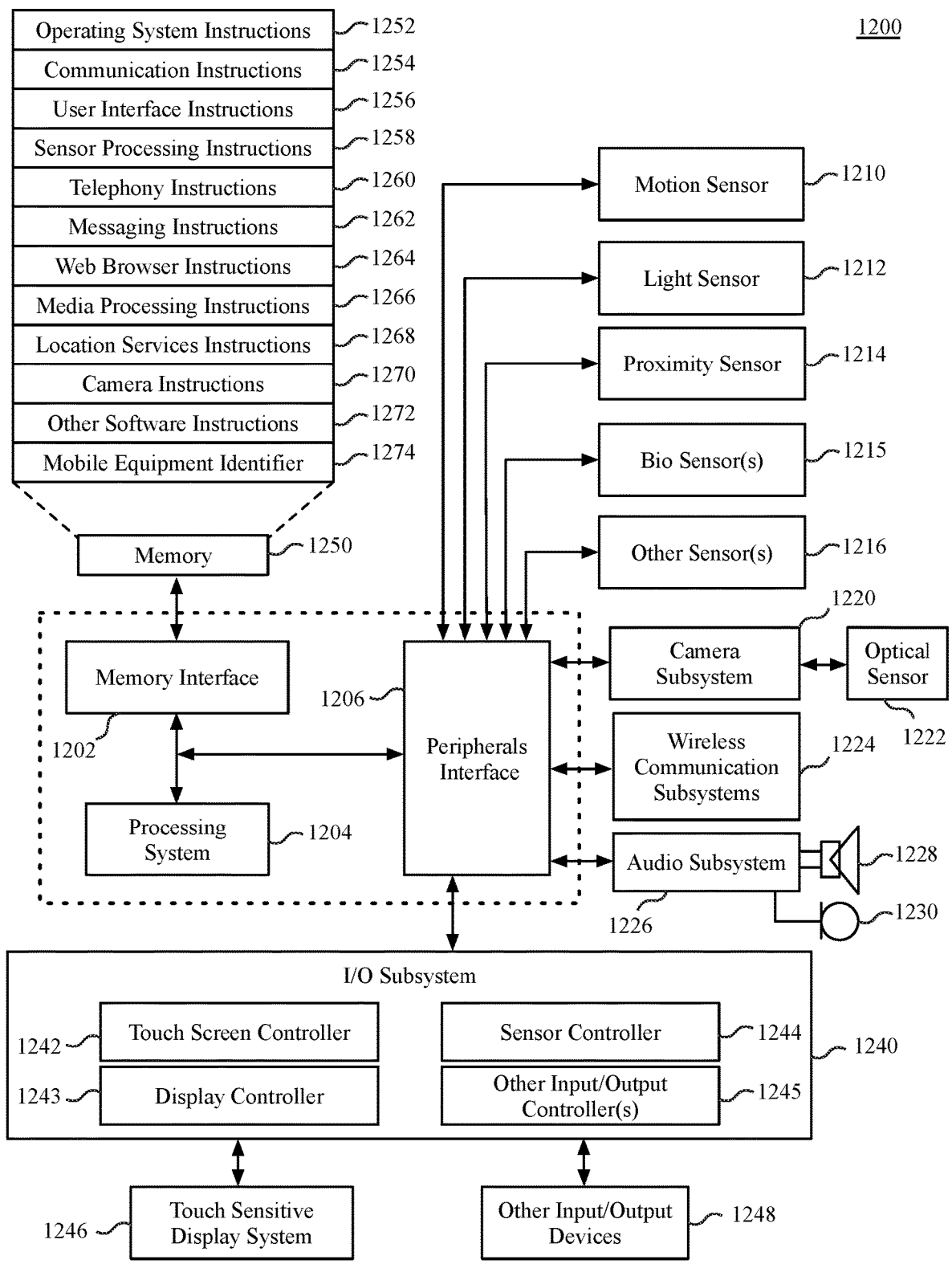
FIG. 12 is a block diagram of a device architecture for a mobile or embedded device, according to an embodiment.

FIG. 12 is a block diagram of a device architecture 1200 for a mobile or embedded device, according to an embodiment. The device architecture 1200 includes a memory interface 1202, a processing system 1204 including one or more data processors, image processors and/or graphics processing units, and a peripherals interface 1206. The various components can be coupled by one or more communication buses or signal lines. The various components can be separate logical components or devices or can be integrated in one or more integrated circuits, such as in a system on a chip integrated circuit.

The memory interface 1202 can be coupled to memory 1250, which can include high-speed random-access memory such as static random-access memory (SRAM) or dynamic random-access memory (DRAM) and/or non-volatile memory, such as but not limited to flash memory (e.g., NAND flash, NOR flash, etc.).

Sensors, devices, and subsystems can be coupled to the peripherals interface 1206 to facilitate multiple functionalities. For example, a motion sensor 1210, a light sensor 1212, and a proximity sensor 1214 can be coupled to the peripherals interface 1206 to facilitate the mobile device functionality. One or more biometric sensor(s) 1215 may also be present, such as a fingerprint scanner for fingerprint recognition or an image sensor for facial recognition. Other sensors 1216 can also be connected to the peripherals interface 1206, such as a positioning system (e.g., GPS receiver), a temperature sensor, or other sensing device, to facilitate related functionalities. A camera subsystem 1220 and an optical sensor 1222, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 1224, which can include radio frequency receivers and transmitters and/or optical (e.g., infrared) receivers and transmitters. The specific design and implementation of the wireless communication subsystems 1224 can depend on the communication network(s) over which a mobile device is intended to operate. For example, a mobile device including the illustrated device architecture 1200 can include wireless communication subsystems 1224 designed to operate over a GSM network, a CDMA network, an LTE network, a Wi-Fi network, a Bluetooth network, or any other wireless network. In particular, the wireless communication subsystems 1224 can provide a communications mechanism over which a media playback application can retrieve resources from a remote media server or scheduled events from a remote calendar or event server.

An audio subsystem 1226 can be coupled-to a speaker 1228 and a microphone 1230 to facilitate voice-enabled functions, such as voice recognition, voice replication, digital recording, and telephony functions. In smart media devices described herein, the audio subsystem 1226 can be a high-quality audio system including support for virtual surround sound.

The I/O subsystem 1240 can include a touch screen controller 1242 and/or other input controller(s) 1245. For computing devices including a display device, the touch screen controller 1242 can be coupled to a touch sensitive display system 1246 (e.g., touch-screen). The touch sensitive display system 1246 and touch screen controller 1242 can, for example, detect contact and movement and/or pressure using any of a plurality of touch and pressure sensing technologies, including but not limited to capacitive, resistive, infrared, and surface acoustic wave technologies, as well as other proximity sensor arrays or other elements for determining one or more points of contact with a touch sensitive display system 1246. Display output for the touch sensitive display system 1246 can be generated by a display controller 1243. In one embodiment, the display controller 1243 can provide frame data to the touch sensitive display system 1246 at a variable frame rate.

In one embodiment, a sensor controller 1244 is included to monitor, control, and/or processes data received from one or more of the motion sensor 1210, light sensor 1212, proximity sensor 1214, or other sensors 1216. The sensor controller 1244 can include logic to interpret sensor data to determine the occurrence of one of more motion events or activities by analysis of the sensor data from the sensors.

In one embodiment, the I/O subsystem 1240 includes other input controller(s) 1245 that can be coupled to other input/control devices 1248, such as one or more buttons, rocker switches, thumb-wheel, infrared port, USB port, and/or a pointer device such as a stylus, or control devices such as an up/down button for volume control of the speaker 1228 and/or the microphone 1230.

In one embodiment, the memory 1250 coupled to the memory interface 1202 can store instructions for an operating system 1252, including portable operating system interface (POSIX) compliant and non-compliant operating system or an embedded operating system. The operating system 1252 may include instructions for handling basic system services and for performing hardware dependent tasks. In some implementations, the operating system 1252 can be a kernel.

The memory 1250 can also store communication instructions 1254 to facilitate communicating with one or more additional devices, one or more computers and/or one or more servers, for example, to retrieve web resources from remote web servers. The memory 1250 can also include user interface instructions 1256, including graphical user interface instructions to facilitate graphic user interface processing.

Additionally, the memory 1250 can store sensor processing instructions 1258 to facilitate sensor-related processing and functions; telephony instructions 1260 to facilitate telephone-related processes and functions; messaging instructions 1262 to facilitate electronic-messaging related processes and functions; web browser instructions 1264 to facilitate web browsing-related processes and functions; media processing instructions 1266 to facilitate media processing-related processes and functions; location services instructions including GPS and/or navigation instructions 1268 and Wi-Fi based location instructions to facilitate location based functionality; camera instructions 1270 to facilitate camera-related processes and functions; and/or other software instructions 1272 to facilitate other processes and functions, e.g., security processes and functions, and processes and functions related to the systems. The memory 1250 may also store other software instructions such as web video instructions to facilitate web video-related processes and functions; and/or web shopping instructions to facilitate web shopping-related processes and functions. In some implementations, the media processing instructions 1266 are divided into audio processing instructions and video processing instructions to facilitate audio processing-related processes and functions and video processing-related processes and functions, respectively. A mobile equipment identifier, such as an International Mobile Equipment Identity (IMEI) 1274 or a similar hardware identifier can also be stored in memory 1250.

Each of the above identified instructions and applications can correspond to a set of instructions for performing one or more functions described above. These instructions need not be implemented as separate software programs, procedures, or modules. The memory 1250 can include additional instructions or fewer instructions. Furthermore, various functions may be implemented in hardware and/or in software, including in one or more signal processing and/or application specific integrated circuits.

Figure 13:
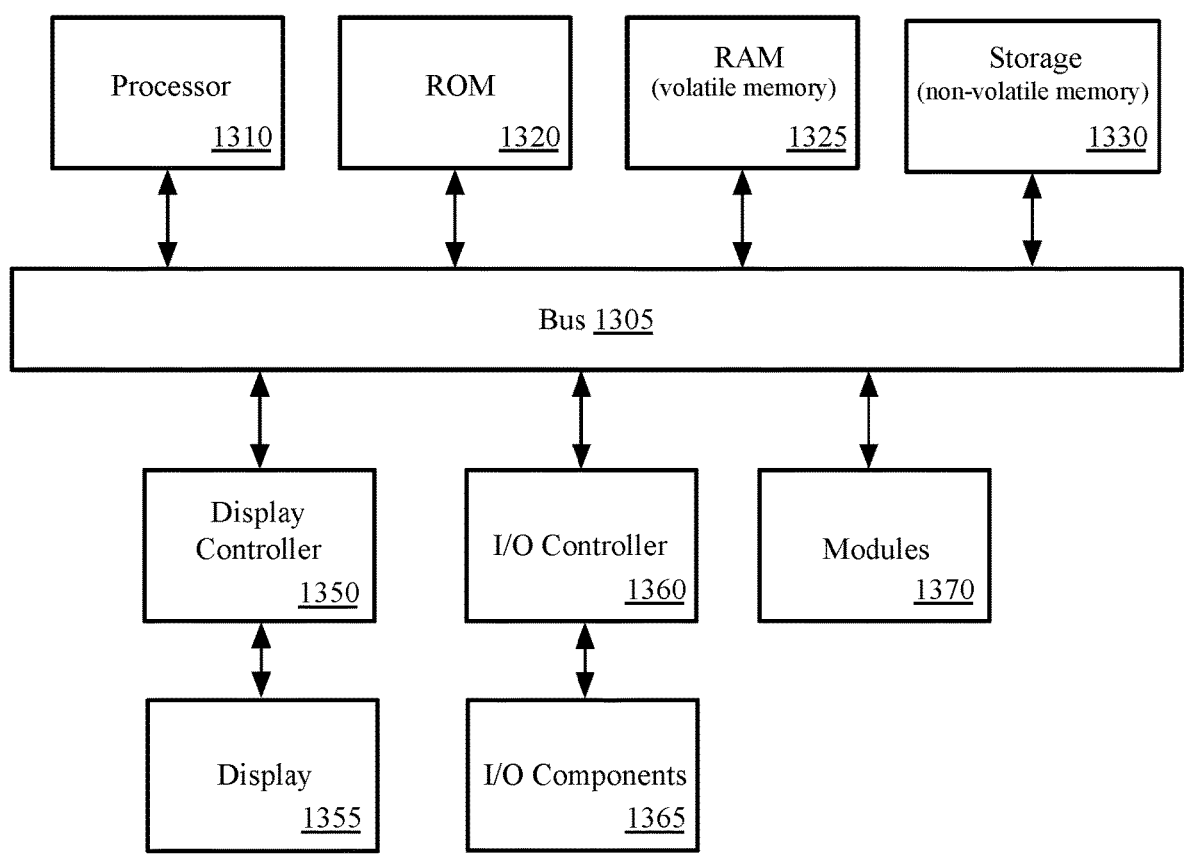
FIG. 13 is a block diagram of a computing system, according to an embodiment.

FIG. 13 is a block diagram of a computing system 1300, according to an embodiment. The illustrated computing system 1300 is intended to represent a range of computing systems (either wired or wireless) including, for example, desktop computer systems, laptop computer systems, tablet computer systems, cellular telephones, personal digital assistants (PDAs) including cellular-enabled PDAs, set top boxes, entertainment systems or other consumer electronic devices, smart appliance devices, or one or more implementations of a smart media playback device. Alternative computing systems may include more, fewer and/or different components. The computing system 1300 can be used to provide the computing device and/or a server device to which the computing device may connect.

The computing system 1300 includes bus 1335 or other communication device to communicate information, and processor(s) 1310 coupled to bus 1335 that may process information. While the computing system 1300 is illustrated with a single processor, the computing system 1300 may include multiple processors and/or co-processors. The computing system 1300 further may include memory 1320, which can be random access memory (RAM) or other dynamic storage device coupled to the bus 1335. The memory 1320 may store information and instructions that may be executed by processor(s) 1310. The memory 1320 may also be used to store temporary variables or other intermediate information during execution of instructions by the processor(s) 1310.

The computing system 1300 may also include read only memory (ROM) 1330 and/or another data storage device 1340 coupled to the bus 1335 that may store information and instructions for the processor(s) 1310. The data storage device 1340 can be or include a variety of storage devices, such as a flash memory device, a magnetic disk, or an optical disc and may be coupled to computing system 1300 via the bus 1335 or via a remote peripheral interface.

The computing system 1300 may also be coupled, via the bus 1335, to a display device 1350 to display information to a user. The computing system 1300 can also include an alphanumeric input device 1360, including alphanumeric and other keys, which may be coupled to bus 1335 to communicate information and command selections to processor(s) 1310. Another type of user input device includes a cursor control 1370 device, such as a touchpad, a mouse, a trackball, or cursor direction keys to communicate direction information and command selections to processor(s) 1310 and to control cursor movement on the display device 1350. The computing system 1300 may also receive user input from a remote device that is communicatively coupled via one or more network interface(s) 1380.

The computing system 1300 further may include one or more network interface(s) 1380 to provide access to a network, such as a local area network. The network interface(s) 1380 may include, for example, a wireless network interface having antenna 1385, which may represent one or more antenna(e). The computing system 1300 can include multiple wireless network interfaces such as a combination of Wi-Fi, Bluetooth®, near field communication (NFC), and/or cellular telephony interfaces. The network interface(s) 1380 may also include, for example, a wired network interface to communicate with remote devices via network cable 1387, which may be, for example, an Ethernet cable, a coaxial cable, a fiber optic cable, a serial cable, or a parallel cable.

In one embodiment, the network interface(s) 1380 may provide access to a local area network, for example, by conforming to IEEE 802.11 standards, and/or the wireless network interface may provide access to a personal area network, for example, by conforming to Bluetooth standards. Other wireless network interfaces and/or protocols can also be supported. In addition to, or instead of, communication via wireless LAN standards, network interface(s) 1380 may provide wireless communications using, for example, Time Division, Multiple Access (TDMA) protocols, Global System for Mobile Communications (GSM) protocols, Code Division, Multiple Access (CDMA) protocols, Long Term Evolution (LTE) protocols, and/or any other type of wireless communications protocol.

The computing system 1300 can further include one or more energy sources 1305 and one or more energy measurement systems 1345. Energy sources 1305 can include an AC/DC adapter coupled to an external power source, one or more batteries, one or more charge storage devices, a USB charger, or other energy source. Energy measurement systems include at least one voltage or amperage measuring device that can measure energy consumed by the computing system 1300 during a predetermined period of time. Additionally, one or more energy measurement systems can be included that measure, e.g., energy consumed by a display device, cooling subsystem, Wi-Fi subsystem, or other frequently used or high-energy consumption subsystem.

As described above, one aspect of the present technology is the gathering and use of data available from specific and legitimate sources to improve user experience with respect to granting access to protected resources on a data processing system. The present disclosure contemplates that in some instances, this gathered data may include personal information data regarding application usage patterns for a user. The gathering of such application usage patterns may also inadvertently reveal other information that may be used to uniquely identify the user, such as demographic data, location-based data, online identifiers, telephone numbers, email addresses, home addresses, data or records relating to a user's health or level of fitness (e.g., vital signs measurements, medication information, exercise information), date of birth, or any other personal information. The present disclosure recognizes that the use of such personal information data, in the present technology, can be used to the benefit of users, for example, to improve the user experience with performing tasks using a data processing system or computing device described herein.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during system configuration or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services In the foregoing description, example embodiments of the disclosure have been described. It will be evident that various modifications can be made thereto without departing from the broader spirit and scope of the disclosure. The specification and drawings are, accordingly, to be regarded in an illustrative sense rather than a restrictive sense. The specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Additionally, various components described herein can be a means for performing the operations or functions described herein.

Embodiments described herein provide techniques to limit programmatic access to privacy related user data and system resources for applications that execute outside of a sandbox or other restricted operating environment while enabling a user to grant additional access to those applications via prompts presented to the user via a graphical interface. In a further embodiment, techniques are applied to limit the frequency in which a user is prompted by learning the types of files or resources to which a user is likely to permit or deny access.

One embodiment provides for a computer-implemented method comprising launching a first process on a computing system having a restricted operating environment, executing the first process outside of the restricted operating environment while allowing default access to a first set of resources, receiving a first request from the first process to access a first resource, the first resource not in the first set of resources, in response to the first request, displaying a prompt via a graphical interface of the computer system to determine a permission to access the first resource by the first process, storing a record of permission to enable the first process to access the first resource, and after storing the record of permission, enabling the first process to access a second resource based on the record of permission to access the first resource, where the first resource and the second resource have a common storage characteristic.

One embodiment provides for a non-transitory machine-readable medium storing instructions which, when executed by one or more processors, cause the one or more processors to perform operations comprising launching a first process on a computing system having a restricted operating environment, executing the process outside of the restricted operating environment while allowing default access to a second set of resources, receiving a delegation of privilege from a second process having access to a second resource, the second resource outside of the second set of resources, the second resource having a first storage classification, recording the delegation of privilege to indicate that the first process is permitted to access the second resource, receiving a request from the first process to access a first resource having the first storage classification, and enabling the first process to access the first resource based on the recorded delegation, where the first resource is in a file system subpath of the second resource.

One embodiment provides a data processing system comprising a memory device to store instructions for execution and one or more processors to execute the instructions from memory. The instructions, when executed, cause the one or more processors to record statistics for access prompts presented via a graphical interface, analyze statistics to determine existence of a pattern, the pattern based on an application and a resource type, receive a request, from a process, to access a resource, where the request would otherwise trigger an access prompt via a user interface of the data processing system, and determine if a pattern exists for the process and the resource type associated with the request. In response to determination that the pattern exists for the process and the resource type associated with the request, the one or more processors are to bypass display of the access prompt and enable or deny access for the process based on the pattern.

Other features of the present embodiments will be apparent from the accompanying drawings and from the detailed description above. Accordingly, the true scope of the embodiments will become apparent to the skilled practitioner upon a study of the drawings, specification, and following claims.

What is claimed is:

1. A data processing system comprising:
a memory device to store instructions for execution;
one or more processors to execute the instructions from memory, where the instructions cause the one or more processors to:
record statistics for access prompts presented via a trusted component of a graphical interface, the access prompts presented on behalf of a plurality of different applications to enable access a plurality of differing resource types;
analyze statistics to determine existence of a pattern, the pattern based on an application and a resource type;
receive a request, from a process associated with the application, to access a resource having a resource type of the plurality of differing resource types, wherein the request would otherwise trigger an access prompt via the trusted component of the graphical interface;

determine if a pattern exists for the application associated with the process and the resource type of the resource associated with the request;

in response to determination that the pattern exists for the process and the resource type associated with the request:

bypass display of the access prompt; and enable or deny access to the resource for the process based on the pattern.

2. The data processing system as in claim 1, wherein to enable or deny access for the process based on the pattern includes to enable a process associated with an image editor to access to an image data file.

3. The data processing system as in claim 1, wherein to enable or deny access for the process based on the pattern includes to enable a process associated with an audio or music editor to access to an audio or music data file.

4. The data processing system as in claim 1, further comprising an access learning module to analyze the statistics to determine the pattern based on application and resource type.

5. The data processing system as in claim 4, wherein the access learning module includes a machine learning module to execute a machine learning model, the machine learning model is trained on the statistics for access prompts presented via the graphical interface, and training data for the machine learning model is maintained only on the data processing system.

6. The data processing system as in claim 4, wherein the plurality of differing resource types include a file-system path or a type of data.

7. A non-transitory machine-readable medium storing instructions to cause one or more processors of an electronic device to perform operations comprising:

recording statistics for access prompts presented via a trusted component of a graphical interface, the access prompts presented on behalf of a plurality of different applications to enable access a plurality of differing resource types;

analyzing statistics to determine existence of a pattern, the pattern based on an application and a resource type;

receiving a request, from a process associated with the application, to access a resource having a resource type of the plurality of differing resource types, wherein the request would otherwise trigger an access prompt via the trusted component of the graphical interface;

determining if a pattern exists for the application associated with the process and the resource type of the resource associated with the request;

in response to determining that the pattern exists for the process and the resource type associated with the request:

bypassing display of the access prompt; and enabling or deny access to the resource for the process based on the pattern.

8. The non-transitory machine-readable medium as in claim 7, wherein to enable or deny access for the process based on the pattern includes to enable a process associated with an image editor to access to an image data file.

9. The non-transitory machine-readable medium as in claim 7, wherein to enable or deny access for the process based on the pattern includes to enable a process associated with an audio or music editor to access to an audio or music data file.

10. The non-transitory machine-readable medium as in claim 7, the operations further comprising an access learning module to analyze the statistics to determine the pattern based on application and resource type.

11. The non-transitory machine-readable medium as in claim 10, wherein the access learning module includes a machine learning module to execute a machine learning model, the machine learning model is trained on the statistics for access prompts presented via the graphical interface, and training data for the machine learning model is maintained only on the electronic device.

12. The non-transitory machine-readable medium as in claim 10, wherein the plurality of differing resource types include a file-system path or a type of data.

13. A method comprising:

on an electronic device:

recording statistics for access prompts presented via a trusted component of a graphical interface, the access prompts presented on behalf of a plurality of different applications to enable access a plurality of differing resource types;

analyzing statistics to determine existence of a pattern, the pattern based on an application and a resource type;

receiving a request, from a process associated with the application, to access a resource having a resource type of the plurality of differing resource types, wherein the request would otherwise trigger an access prompt via the trusted component of the graphical interface;

determining if a pattern exists for the application associated with the process and the resource type of the resource associated with the request;

in response to determining that the pattern exists for the process and the resource type associated with the request:

bypassing display of the access prompt; and enabling or deny access to the resource for the process based on the pattern.

14. The method as in claim 13, wherein to enable or deny access for the process based on the pattern includes to enable a process associated with an image editor to access to an image data file.

15. The method as in claim 13, wherein to enable or deny access for the process based on the pattern includes to enable a process associated with an audio or music editor to access to an audio or music data file.

16. The method as in claim 13, further comprising an access learning module to analyze the statistics to determine the pattern based on application and resource type.

17. The method as in claim 16, wherein the access learning module includes a machine learning module to execute a machine learning model, the machine learning model is trained on the statistics for access prompts presented via the graphical interface, and training data for the machine learning model is maintained only on the electronic device.

18. The method as in claim 16, wherein the plurality of differing resource types include a file-system path or a type of data.

* * * * *

UNITED STATES PATENT AND TRADEMARK OFFICE
CERTIFICATE OF CORRECTION

PATENT NO. : 11,017,109 B1
APPLICATION NO. : 16/404538
DATED : May 25, 2021
INVENTOR(S) : Kelly B. Yancey et al.

It is certified that error appears in the above-identified patent and that said Letters Patent is hereby corrected as shown below:

In the Claims

Claim 1, Column 20, Line 60, delete "to enable access a plurality" and insert --to enable access to a plurality--

Claim 7, Column 21, Line 41, delete "to enable access a plurality" and insert --to enable access to a plurality--
Claim 7, Column 21, Line 57, delete "enabling or deny access" and insert --enabling or denying access--

Claim 13, Column 22, Line 24, delete "to enable access a plurality" and insert --to enable access to a plurality--
Claim 13, Column 22, Line 41, delete "enabling or deny access" and insert --enabling or denying access--

Signed and Sealed this
Twenty-second Day of June, 2021

Drew Hirshfeld
*Performing the Functions and Duties of the*
*Under Secretary of Commerce for Intellectual Property and*
*Director of the United States Patent and Trademark Office*